United States Patent [19]

Oishi et al.

[11] Patent Number: 4,886,341
[45] Date of Patent: Dec. 12, 1989

[54] DIFFRACTION GRATING HAVING A PLURALITY OF DIFFERENT GRATING CONSTANTS

[75] Inventors: Konosuki Oishi, Mito; Kenshi Sugahara, Katsuta, both of Japan

[73] Assignee: Hitachi, Ltd., Tokyo, Japan

[21] Appl. No.: 68,412

[22] Filed: Jul. 1, 1987

[30] Foreign Application Priority Data

Jul. 2, 1986 [JP] Japan .................. 61-155647

[51] Int. Cl.$^4$ ............. G02B 5/18; G01J 3/28
[52] U.S. Cl. .............. 350/162.22; 350/162.23; 356/328
[58] Field of Search .......... 350/162.2, 162.22, 162.24, 350/162.23; 356/328, 334

[56] References Cited

U.S. PATENT DOCUMENTS

| 3,015,984 | 1/1962 | Martin | 356/334 X |
| 3,045,532 | 7/1962 | Staunton | 350/162.22 |
| 3,791,737 | 2/1974 | Johansson | 356/328 X |
| 4,528,448 | 7/1985 | Doggett | 350/3.71 X |

FOREIGN PATENT DOCUMENTS

| 58-117511 | 7/1983 | Japan | 350/162.22 |
| 934246 | 6/1982 | U.S.S.R. | 356/328 |

Primary Examiner—Rodney B. Bovernick
Assistant Examiner—David J. Edmondson
Attorney, Agent, or Firm—Antonelli, Terry & Wands

[57] ABSTRACT

In a diffraction grating grooves having at least two kinds of grating constants are alternately arranged so as to repetitive at a constant period.

6 Claims, 3 Drawing Sheets

DIFFRACTION GRATING HAVING A PLURALITY OF DIFFERENT GRATING CONSTANTS

BACKGROUND OF THE INVENTION

The present invention relates to a diffraction grating for dispersing the light emitted from a light source every wavelength in a spectrophotometer.

As shown in the specification of U.S. Pat. No. 3,045,532, as a diffraction grating for dispersing the light every wavelength, a diffraction grating in which a grating constant of a groove is constant is used.

FIG. 1 is a diagram showing a cross section which is vertical to a ruled groove of a conventional Echellette type diffraction grating. A number of triangle grooves 2 are formed on a surface 3 of a diffraction grating 1 at regular intervals of d (mm). The interval d of the grooves 2 is also called a grating constant.

In FIG. 1, when an incident light beam 5 enters at an angle $\theta$ for a grating normal 4 which is vertical to the surface 3 of the diffraction grating 1 and a diffraction light beam 6 is diffracted at an angle $\phi$, the relations among the angles $\theta$ and $\phi$ and a wavelength $\lambda$ (nm) of diffraction light 6 are expressed by the following well-known equation.

$$N \cdot \lambda = d \cdot (\sin\theta - \sin\phi) \tag{1}$$

where, $\lambda$: wavelength of diffraction light beam,
d: grating constant,
$\theta$: angle between the incident light beam and the grating normal,
$\phi$: angle between the diffraction light beam and the grating normal,
N: degree (integer) of diffraction light.

An Echellette type diffraction grating which has been put into practical use is manufactured in a manner such that the shape of groove 2 is formed into a triangle, thereby enabling about 90% of the energy of the diffraction light beam to be concentrated when the degree $N=1$ and $N=2$. Therefore, it is possible to consider such that in the equation (1), the degree N has the values of $$N = 1 \text{ and } 2 \tag{2}$$

FIG. 2 is a block diagram showing a constitution of a spectrophotometer using the Echellette type diffraction grating shown in FIG. 1. The white light beam emitted from a light source 11 passes through a lens 12 and is transmitted through a specimen chamber 13 and enters an incident slit 14 of the spectrophotometer. Thereafter, the light transmitted through the slit 14 is converted into a parallel light beam 16 by a collimating lens mirror 15 and enters a diffraction grating 17. The parallel light beam diffracted at a constant angle by the surface of the diffraction grating 17 enters a camera mirror 19 and is focused onto an outlet slit 20. A wavelength of light beam focused on the outlet slit 20 becomes a wavelength of monochromatic light determined by the equation (1). The monochromatic light enters a photomultiplier 21 and is converted into an electric signal. Thereafter, the electric signal is arithmetically processed in a signal processor 22 and displayed by a display device 23.

In such a spectrophotometer, in order to adjust the wavelength of monochromatic light which is focused to the outlet slit 20 into a desired wavelength, in the central portion of the surface where the light enters the diffraction grating 17, a straight line which is parallel with the groove is used as a rotary axis 24 and the diffraction grating 1 is rotated by only a constant angle by a wavelength drive section 18.

Now, assuming that the collimating lens mirror 15 and camera mirror 19 are fixed, the sum of the incident angle $\theta$ and diffraction angle $\phi$ of the diffraction grating 17 becomes constant. Namely, it can be expressed by the following equation.

$$\theta + \phi = 2K_0 \tag{3}$$

When the equation (1) is rewritten using the equation (3), we have $$N \cdot \lambda = 2d \cdot \sin(\theta - K_0) \cdot \cos K_0 \tag{4}$$

In this case, since $$\sin(\theta - K_0) \cdot \cos K_0 \leq 1 \tag{5}$$

there is a limitation in selection of the wavelength $\lambda$. Namely, $$\lambda \leq \frac{2 \cdot d}{N} \tag{6}$$

If the primary light ($N=1$) having the largest intensity of diffraction light is used, we have $$\lambda \leq 2d \tag{7}$$

Namely, in the conventional apparatus shown in FIG. 2, there is an important drawback such that when a grating constant of diffraction grating is set to d, a wavelength range which the spectrometer can select is limited to a value below 2d (mm).

On the other hand, a dispersion power (spectrum width to a unit slit width) of conventional spectrophotometer shown in FIG. 2 is expressed by the following equation.

$$\text{Dispersion power } \frac{\Delta\lambda}{\Delta s} = \frac{d \cdot \cos\phi}{N \cdot f} \tag{8}$$

where,
$\Delta s$: slit width (it is assumed that a width of incident slit is equal to a width of emitting slit)
$\Delta\lambda$: width of spectrum which is emitted from the slit having the width $\Delta s$
f: focal distance of camera mirror
N: degree of diffraction grating Assuming that $N=1$ in the equations (6) and (8), the following points will be understood.

(I) The grating constant d of diffraction grating needs to be set to a large value in order to widen a wavelength range which the spectrophotometer can select.

(II) The grating constant of diffraction grating needs to be set to a small value in order to raise a dispersion power of spectrophotometer.

Namely, the spectrophotometer using a conventional diffraction grating has a characteristic such that the wavelength range and dispersion power are contradictory. Thus, there is a problem such that a dispersion power must be reduced to widen a wavelength range and, on the contrary, a wavelength range must be narrowed to improve a dispersion power.

SUMMARY OF THE INVENTION

It is an object of the invention to provide a diffraction grating which can widen a wavelength range without deteriorating a dispersion power.

According to the invention, the grooves of two kinds of grating constants are alternately arranged at a constant period.

Such an alternate arrangement of the grooves of different grating constants at a constant period results in that a plurality of diffraction gratings are provided. Therefore, when a diffraction grating of a small grating constant is used, although a wavelength range is narrow, a high dispersion power can be derived. When a diffraction grating of a large grating constant is used, although a dispersion power deteriorates, a long wavelength range can be used.

DESCRIPTION OF THE PREFERRED EMBODIMENT

Figure 1:
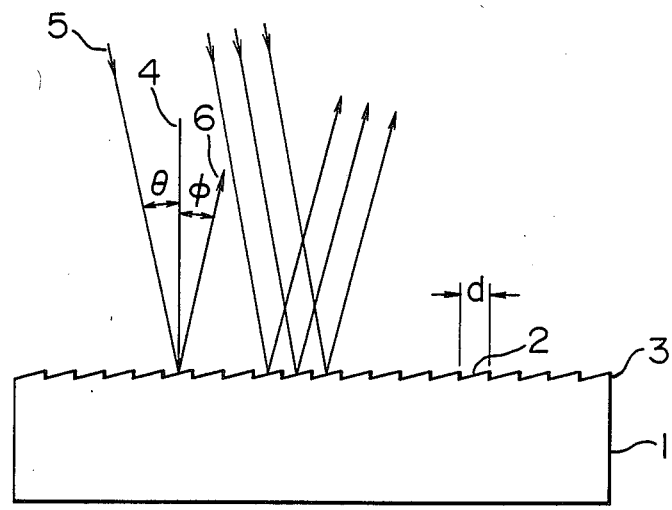
FIG. 1 is a cross sectional view of a conventional diffraction grating.
Figure 2:
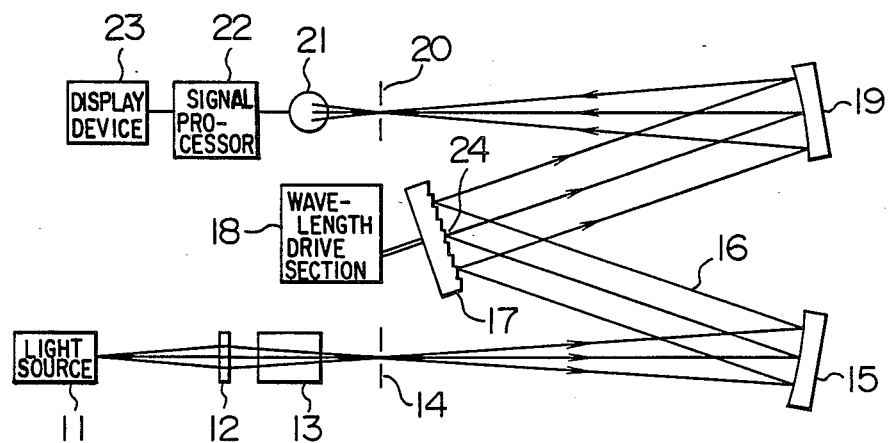
FIG. 2 is a block diagram showing a spectrophotometer using a conventional diffraction grating.
Figure 3:
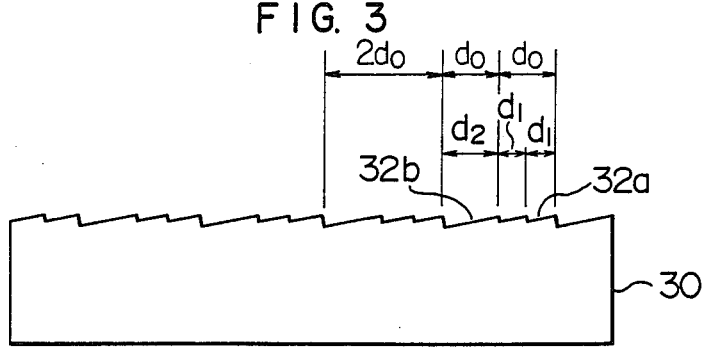
FIG. 3 is a cross sectional view of a diffraction grating of the present invention.

FIG. 3 is a cross sectional view showing an embodiment of a diffraction grating according to the present invention. Grooves 32a having a grating constant $d_1$ (mm) and grooves 32b having a grating constant $d_2$ (mm) are alternately arranged so as to be repetitive on the surface of a diffraction grating 30 at a constant period of $2d_0$ (mm) where as shown $d_0 = d_2 = 2d_1$.

A ratio of the grating constant $d_2$ to the grating constant $d_1$ is set to a natural number. There is the relation of $d_2 = 2d_1$ between the large grating constant $d_2$ and the small grating constant $d_1$, namely, the sum of small grating constants is equalized to the large grating constant.

Figure 4:
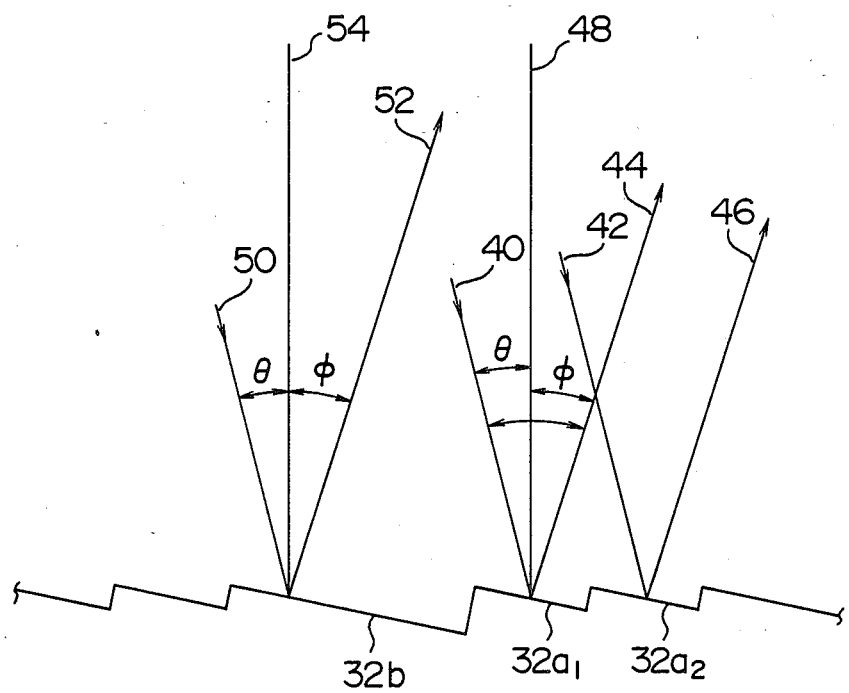
FIG. 4 is an enlarged diagram of FIG. 3.

FIG. 4 is an enlarged diagram of the surface of grating. It is assumed that angles of light beams 40 and 42 which enter grooves $32a_1$ and $32a_2$ having the grating constant $d_1$ to a grating normal 48 are $\theta$, angles of diffraction lights 44 and 46 to the grating normal 48 are $\phi$, and the incident light beams 40 and 42 and the diffraction lights 44 and 46 are the parallel plane waves. In this case, a phase difference $D_1$ between the incident light beams 40 and 42 and the diffraction light beams 44 and 46 is expressed by the following equation.

$$D_1 = d_1(\sin\theta - \sin\phi)/\lambda_1 \qquad (9)$$

Therefore, the following relational equation is satisfied between the parallel light beams which were input to the grooves of the grating constant $d_1$ and the parallel light beams diffracted therefrom.

$$N_1 \cdot \lambda_1 = d_1(\sin\theta - \sin\phi) \qquad (10)$$

$$N_1 = 1, 2, 3, \ldots$$

Next, it is assumed that angles of a light beam 50 which enters the groove 32b of the grating constant $d_2$ to a grating normal 54 of a diffraction light beam 52 are similarly $\theta$ and $\phi$.

A phase difference $D_2$ of the waves between the incident light beams 50 and 40 and the diffraction light beams 52 and 44 is expressed by the following equation.

$$D_2 = d_2(\sin\theta - \sin\phi)/\lambda_2 \qquad (11)$$

Therefore, the following relational equation is satisfied between those light beams.

$$N_2 \cdot \lambda_2 = d_2(\sin\theta - \sin\phi) \qquad (12)$$

Namely, in this diffraction grating, the lights of two different wavelengths $\lambda_1$ and $\lambda_2$ are diffracted in the direction of the diffraction angle $\phi$. To simply explain, the degrees $N_1$ and $N_2$ are equalized to 1. Assuming that $$d_2 = 2d_1 = 2d \qquad (13)$$

the phase differences $D_1$ and $D_2$ are set into $$2D_1 = D_2 \qquad (14)$$

When the wavelengths are equal, the phase differences between the incident light beams 50, 40, and 42 and their diffraction light beams 52, 44, and 46 become $D_1$ and $2D_1$, which is twice as large as $D_1$, so that those light beams are mutually interfered. Therefore, a constitution of the present invention essentially differs from a diffraction grating in which an area of a single diffraction grating is divided into halves and a grating constant of one of the two areas is set to $d_1$ and a grating constant of the other area is set to $2d_1$, namely, two kinds of diffraction gratings are arranged on the right and left sides to thereby integrally constitute a single diffraction grating.

In the diffraction grating of the invention, when a wavelength $\lambda$ of diffraction light increases and exceeds a value of $\lambda \leq 2d_1$, the diffraction light based on the equation (12) is derived. In this way, a wavelength range is widened to $$\lambda = 4d_1$$

Figure 5:
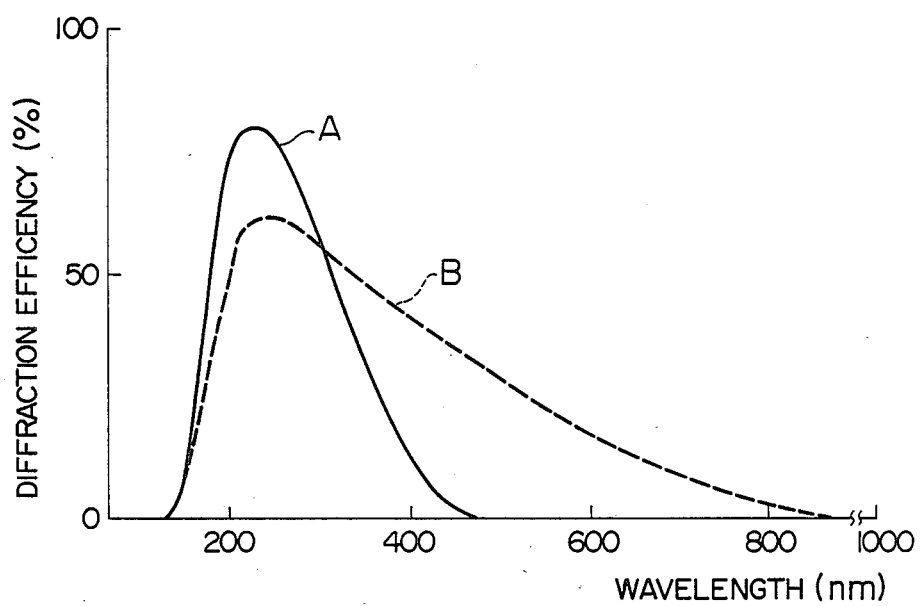
FIG. 5 is a diagram showing a diffraction efficiency curve.

FIG. 5 shows diffraction efficiency graphs in which an axis of abscissa indicates a wavelength and an axis of ordinate represents an efficiency (intensity of incident light/intensity of diffraction light $\times 100\%$) of the diffraction light. A curve A shows a conventional diffraction efficiency graph. A curve B shows a diffraction efficiency graph of the invention. The curve A is obtained when a grating constant d is set to 1/3600 mm. The curve B is derived when a grating constant $d_1$ is set to 1/1800 mm and a grating constant $d_2$ is set to 1/3600 mm.

As will be obvious from FIG. 5, the curve A shows that the efficiency is zero when a wavelength is near 460 nm and the curve B shows that the efficiency is zero when a wavelength is near 860 nm. Namely, according to the diffraction grating of the invention, it will be understood that a wavelength range was widened by about two times.

On the other hand, according to the diffraction grating of the invention, when a wavelength is below 460 nm, since this grating has the same grating constant $d = 1/3600$ mm as that of the conventional diffraction grating, its dispersion power is equal to that of the conventional diffracting grating. Namely, a wavelength range can be widened without deteriorating the dispersion power.

Although the reflection type plane diffraction grating has been described in the foregoing embodiment, the invention can be also applied to the diffraction gratings of the transmission type and the concave diffraction type. On the other hand, although two kinds of grating constants have been set, the invention can be also applied to the cases of three or more kinds of grating constants.

We claim:

1. A diffraction grating comprising a plurality of adjacent sets of different grating constants repetitively arranged at a constant period, each set including at least one groove, wherein when it is assumed that the different grating constants are $d_1, d_2 \ldots$, there is a relation of:

$$d_0 = md_1 = nd_2 = \ldots$$

where m and n are different natural numbers and $d_0$ is a constant; and wherein the constant period equals $d_0$ times the number of the plurality of adjacent sets of different grating constants.

2. A diffraction grating according to claim 1, wherein the number of the plurality of adjacent sets of different grating constants is two, the at least one set has one groove, the adjacent set has two grooves, $m=1$, $n=2$ and the constant period $=2d_0$.

3. A diffraction grating according to claim 1, wherein one of said plurality of adjacent sets of different grating constants includes at least one groove and an adjacent set includes a plurality of grooves different in number than the one set.

4. A diffraction grating according to claim 3, wherein the number of the plurality of adjacent sets of different grating constants is two, the at least one set has one groove, the adjacent set has two grooves, $m=1$, $n=2$ and the constant period $=2d_0$.

5. A diffraction grating according to claim 4, wherein the plurality of adjacent sets are arranged in a direction perpendicular to a longitudinal direction of the at least one groove of each set so as to provide the repetitive arrangement at the constant period.

6. A diffraction grating according to claim 1, wherein the plurality of adjacent sets are arranged in a direction perpendicular to a longitudinal direction of the at least one groove of each set so as to provide the repetitive arrangement at the constant period.

* * * * *